United States Patent
He et al.

(10) Patent No.: US 12,173,108 B2
(45) Date of Patent: Dec. 24, 2024

(54) METHOD OF CHANGING MELT RHEOLOGY PROPERTY OF BIMODAL POLYETHYLENE POLYMER

(71) Applicant: Univation Technologies, LLC, Houston, TX (US)

(72) Inventors: Chuan He, Dunar, WV (US); Timothy R. Lynn, Glen Gardner, NJ (US); Robert N. Reib, Hurricane, WV (US); Bo Liu, Lake Jackson, TX (US)

(73) Assignee: UNIVATION TECHNOLOGIES, LLC, Houston, TX (US)

( * ) Notice: Subject to any disclaimer, the term of this patent is extended or adjusted under 35 U.S.C. 154(b) by 191 days.

(21) Appl. No.: 17/426,147

(22) PCT Filed: Aug. 21, 2019

(86) PCT No.: PCT/US2019/047433
§ 371 (c)(1),
(2) Date: Jul. 28, 2021

(87) PCT Pub. No.: WO2020/046664
PCT Pub. Date: Mar. 5, 2020

(65) Prior Publication Data
US 2024/0101725 A1 Mar. 28, 2024

Related U.S. Application Data

(60) Provisional application No. 62/724,219, filed on Aug. 29, 2018, provisional application No. 62/820,592, filed on Mar. 19, 2019.

(51) Int. Cl.
*C08F 210/16* (2006.01)
*C08F 2/34* (2006.01)
*C08F 4/659* (2006.01)
*C08F 2/38* (2006.01)

(52) U.S. Cl.
CPC ........ *C08F 4/65912* (2013.01); *C08F 210/16* (2013.01); *C08F 2/34* (2013.01); *C08F 2/38* (2013.01); *C08F 2400/02* (2013.01)

(58) Field of Classification Search
CPC ............... C08F 210/16; C08F 2500/05; C08F 2500/12; C08F 2/34; C08F 2/38
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 6,063,877 A | 5/2000 | Kocian et al. |
| 6,489,408 B2 | 12/2002 | Mawson et al. |
| 6,534,604 B2 | 3/2003 | Loveday et al. |
| 6,828,395 B1 | 12/2004 | Ehrman et al. |
| 6,967,184 B2 | 11/2005 | Wenzel et al. |
| 7,157,531 B2 | 1/2007 | Szul et al. |
| 8,318,872 B2 * | 11/2012 | Savatsky ................. C08F 10/00 526/348 |
| 9,221,936 B2 * | 12/2015 | Kuo ........................ C08F 10/02 |
| 10,113,019 B2 | 10/2018 | Savatsky et al. |

(Continued)

FOREIGN PATENT DOCUMENTS

| | | |
|---|---|---|
| EP | 0634421 | 1/1995 |
| EP | 0794200 | 9/1997 |
| EP | 0802202 | 10/1997 |

OTHER PUBLICATIONS

Namkajorn, Montree; Alizadeh, Arash; Romano, Dario; Rastogi, Sanjay; McKenna, Timothy F. L. Condensed Mode Cooling for Ethylene Polymerization: Part III. The Impact of Induced Condensing Agents on Particle Morphology and Polymer Properties Macromolecular Chemistry and Physics (2016), 217(13), 1521-1528 Coden: MCHPES; ISSN: 1022-1352.

Ahmad Mirzaei et al., Fluidized Bed Polyethylene Reactor Modeling in Condensed Mode Operation, Macromol. Symp., 2007, vol. 259, pp. 135-144.

PCT/US2019/047433, International Search Report and Written Opinion with a mailing date of Dec. 10, 2019.

(Continued)

*Primary Examiner* — Rip A Lee

(57) ABSTRACT

A method of independently changing a melt rheology property value of a bimodal polyethylene polymer being made using a bimodal catalyst system in a single gas phase polymerization reactor. The method comprises process conditions comprising alkane(s) in the reactor. The method comprises a bimodal catalyst system that is characterized by an inverse response to alkane(s) concentration. The method comprises changing concentration of the alkane(s) in the reactor by an amount sufficient to effect a measurable change in the melt rheology property value; wherein the bimodal catalyst system is characterized by an inverse response to alkane(s) concentration such that when the alkane(s) concentration is increased, the melt rheology property value of the resulting bimodal polyethylene polymer is decreased, and when the alkane(s) concentration is decreased, the melt rheology property value of the resulting bimodal polyethylene polymer is increased.

8 Claims, No Drawings

(56) References Cited

U.S. PATENT DOCUMENTS

| | | | | |
|---|---|---|---|---|
| 10,167,351 | B2* | 1/2019 | Savatsky | C08F 10/02 |
| 10,399,052 | B2* | 9/2019 | Savatsky | C08F 2/34 |
| 10,941,284 | B2* | 3/2021 | Chandak | C08F 4/64148 |
| 11,142,597 | B2* | 10/2021 | Chandak | C08F 4/64148 |
| 11,161,924 | B2* | 11/2021 | Liu | B32B 27/32 |
| 11,767,385 | B2* | 9/2023 | Liu | C08F 210/16 526/170 |
| 11,827,725 | B2* | 11/2023 | Borse | C08F 210/14 |
| 2006/0173123 | A1 | 8/2006 | Yang et al. | |
| 2011/0275772 | A1 | 11/2011 | Savatsky et al. | |
| 2017/0259236 | A1 | 9/2017 | Savatsky et al. | |
| 2017/0355790 | A1 | 12/2017 | Savatsky et al. | |
| 2017/0362353 | A1 | 12/2017 | Savatsky et al. | |

OTHER PUBLICATIONS

PCT/US2019/047433, International Preliminary Report on Patentability with a mailing date of Mar. 2, 2021.

* cited by examiner

METHOD OF CHANGING MELT RHEOLOGY PROPERTY OF BIMODAL POLYETHYLENE POLYMER

FIELD

Ethylene polymerization process, and bimodal polyethylene polymers made thereby.

INTRODUCTION

Patent application publications and patents in or about the field include US20170355790A1, US20170362353A1, U.S. Pat. Nos. 6,063,877, 7,157,531B2, and 9,221,936B2. Literature includes Montree Namkajorn et al., *Condensed Mode Cooling for Ethylene Polymerization: Part III. The Impact of Induced Condensing Agents on Particle Morphology and Polymer Properties*, Macromolecular Chemistry and Physics, 2016, vol. 217, pp. 1521-1528; and Ahmad Mirzaei et al., *Fluidized Bed Polyethylene Reactor Modeling in Condensed Mode Operation*, Macromol. Symp., 2007, vol. 259, pp. 135-144.

SUMMARY

We discovered a method of independently changing a melt rheology property value of a bimodal polyethylene polymer being made using a bimodal catalyst system in a single gas phase polymerization reactor. The method comprises process conditions comprising alkane(s) in the reactor. The method comprises a bimodal catalyst system that consists essentially of a metallocene catalyst and a single-site non-metallocene catalyst and is characterized by an inverse response to alkane(s) concentration such that when the alkane(s) concentration increases, the melt rheology property value of new bimodal polyethylene polymer being made by the bimodal catalyst system decreases, and when the alkane(s) concentration decreases, the melt rheology property value of new bimodal polyethylene polymer being made by the bimodal catalyst system increases. The method comprises changing concentration of the alkane(s) in the reactor. The amount of change in alkane(s) concentration is sufficient to effect a measurable change in the melt rheology property value. Other than that, the method is not particularly limited.

DETAILED DESCRIPTION

The Summary and Abstract are incorporated here by reference. Some aspects are numbered for ease of reference.

Aspect 1. A method of independently changing a melt rheology property value of a bimodal polyethylene polymer being made using a bimodal catalyst system in a single gas phase polymerization (GPP) reactor under process conditions comprising ($C_5$-$C_{20}$)alkane(s) in the reactor, wherein the bimodal polyethylene polymer comprises a higher molecular weight (HMW) component and a lower molecular weight (LMW) component, wherein the bimodal catalyst system consists essentially of a metallocene catalyst and a single-site non-metallocene catalyst and wherein the bimodal catalyst system is characterized by an inverse response to ($C_5$-$C_{20}$)alkane(s) concentration such that when the ($C_5$-$C_{20}$)alkane(s) concentration is increased, the melt rheology property value of the resulting bimodal polyethylene polymer (new bimodal polyethylene polymer being made by the bimodal catalyst system) is decreased, and when the ($C_5$-$C_{20}$)alkane(s) concentration is decreased, the melt rheology property value of the resulting bimodal polyethylene polymer (new bimodal polyethylene polymer being made by the bimodal catalyst system) is increased; the method comprising changing concentration of the ($C_5$-$C_{20}$) alkane(s) in the reactor by an amount sufficient to effect a measurable change in the melt rheology property value. The ($C_5$-$C_{20}$)alkane(s) may be one or more unsubstituted alkane compounds each independently having from 5 to 20 carbon atoms and being straight chain, branched chain, cyclic, or a combination of cyclic and straight or branched chain.

Other than that, the method of aspect 1 is not particularly limited. For example, the other process condition may be maintained in a steady-state condition so that it does not add to or subtract from the change in the melt rheology property value made by the change in ($C_5$-$C_{20}$)alkane(s) concentration. This aspect is useful for preventing changes to other properties of the bimodal polyethylene polymer that may be caused by changing the other process condition, but not caused by changing the ($C_5$-$C_{20}$)alkane(s) concentration. Alternatively, the other process condition may be changed in such a way that it adds to (enhances or supplements) the change in the melt rheology property value made by the change in ($C_5$-$C_{20}$)alkane(s) concentration. This aspect is useful for making greater changes to the melt rheology property value than is practical or possible by changing the ($C_5$-$C_{20}$)alkane(s) concentration alone. Alternatively, the other process condition may be changed in such a way that it partially subtracts from (incompletely counteracts) the change in the melt rheology property value made by the change in ($C_5$-$C_{20}$)alkane(s) concentration. This aspect is useful for counteracting unwanted changes to other properties of the bimodal polyethylene polymer that may be caused by changing the ($C_5$-$C_{20}$)alkane(s) concentration, but beneficially counteracted by changing the other process condition. The GPP reactor may be a stirred bed GPP (SB-GPP) reactor or a floating bed GPP (FB-GPP) reactor. For comparison purposes, the sample of the bimodal polyethylene polymer used to measure the melt rheology property is the bimodal polyethylene polymer as discharged from the GPP reactor. Alternatively, the sample may be a composition consisting essentially of the bimodal polyethylene polymer, Antioxidant 1, Antioxidant 2, and Catalyst Neutralizer 1 as prepared by the Formulation and Pelletization Procedure, as described later in the Examples.

Aspect 2. The method of aspect 1 wherein the melt rheology property being changed is a melt flow ratio or a modulus ratio or both. The melt flow ratio is a ratio of two different melt indexes such as $I_{21}/I_2$, $I_{10}/I_5$, or $I_{21}/I_5$, wherein $I_2$, $I_5$, $I_{10}$, and $I_{21}$ are measured according to ASTM D1238-13 (190° C., and a load of 2.16 kg, 5.0 kg, 10.0 kg, or 21.6 kg, respectively). The modulus ratio is a ratio of two different moduluses such as elastic modulus/viscous modulus or tensile modulus/flexural modulus.

Aspect 3. The method of aspect 2 wherein the melt flow ratio is $I_{21}/I_5$, also called MFR5, wherein MFR5 equals $I_{21}/I_5$; measured according to Melt Flow Ratio MFR5 Test Method, described later; and the modulus ratio is melt elasticity G'/G" (0.1 radians per second) wherein G' is elastic (storage) modulus and G" is viscous (loss) modulus), measured according to the Melt Elasticity Test Method, described later. Alternatively, the melt flow ratio may be MFR2, wherein MFR2 equals $I_{21}/I_2$, measured according to the Melt Flow Ratio MFR2, described later.

Aspect 4. The method of any one of aspects 1 to 3 comprising feeding into the GPP reactor a controlled amounts of fresh quantity of ethylene, fresh quantity of the bimodal catalyst system, fresh quantity of the ($C_5$-$C_{20}$)alkane(s), optionally fresh quantity of hydrogen gas ($H_2$), if any, characterized by a hydrogen-to-ethylene ($H_2/C_2$) molar ratio, and optionally fresh quantity of an alpha-olefin, if any, characterized by an alpha-olefin-to-ethylene ($C_x/C_2$) molar ratio; polymerizing in the GPP reactor some of the ethylene and, optionally, the alpha-olefin (if any) with the bimodal catalyst system; (d) discharging from the GPP reactor a gas/vapor mixture ("discharged gas/vapor mixture) comprising vented ($C_5$-$C_{20}$)alkane(s), vented unreacted ethylene, vented unreacted hydrogen gas, if any, and vented unreacted alpha-olefin, if any, wherein the discharged gas/vapor mixture is characterized by a total concentration of the vented ($C_5$-$C_{20}$)alkane(s) therein of from 1.0 to 20.0 mole percent (mol %); and making in the GPP reactor a first bimodal polyethylene polymer having a melt rheology property characterized by a first value; wherein the changing comprises increasing or decreasing the controlled amount of the fresh ($C_4$-$C_{12}$) alkane(s) being fed into the GPP reactor so as to effectively increase or decrease, respectively, the total concentration of the vented ($C_5$-$C_{20}$)alkane(s) in the discharged gas/vapor mixture by at least 1.0 mol %; and after the changing step making a second bimodal polyethylene polymer having the melt rheology property characterized by a second steady-state value, which is lesser than or greater than, respectively, the first steady-state value by at least ±1.0%. The total concentration of the vented ($C_5$-$C_{20}$)alkane(s) in the discharged gas/vapor mixture is used herein as a proxy for the total concentration of the ($C_5$-$C_{20}$)alkane(s) in the GPP reactor. The increasing or decreasing the total concentration of the vented ($C_5$-$C_{20}$)alkane(s) in the discharged gas/vapor mixture by at least 1.0 mol % is merely a way of ensuring that the concentration of the ($C_5$-$C_{20}$)alkane(s) in the GPP reactor (e.g., a floating bed GPP reactor) is increasing or decreasing by at least 1.0 mol % during the step of changing concentration of the ($C_5$-$C_{20}$)alkane(s) in the reactor by an amount sufficient to effect a measurable change in the melt rheology property value of the bimodal polyethylene polymer being made in the GPP reactor. Without wishing to be bound by theory, it is believed that the total concentration of the vented ($C_5$-$C_{20}$)alkane(s) in the discharged gas/vapor mixture itself is not directly responsible for changing the melt rheology property value. It is believed that it is the changing of the concentration of ($C_5$-$C_{20}$)alkane(s) in the GPP reactor itself that is responsible for changing the melt rheology property value Aspect 5. The method of any one of aspects 1 to 4 wherein the metallocene catalyst of the bimodal catalyst system is an (alkyl-substituted cyclopentadienyl)(unsubstituted or alkyl-substituted cyclopentadienyl)MX$_2$ and the single-site non-metallocene catalyst of the bimodal catalyst system is an ((alkyl-substituted phenylamido) ethyl)amine MX$_2$, wherein each M independently is zirconium (Zr) or hafnium (Hf); and each X is independently selected from F, Cl, Br, I, benzyl, —CH$_2$Si (CH$_3$)$_3$, a ($C_1$-$C_5$)alkyl, and a ($C_2$-$C_5$)alkenyl. Each X independently may be fluoride, chloride, bromide, benzyl, or ($C_1$-$C_4$)alkyl; alternatively fluoride, chloride, benzyl, or ($C_1$-$C_2$)alkyl. The (alkyl-substituted cyclopentadienyl)(unsubstituted or alkyl-substituted cyclopentadienyl)zirconium X$_2$ may be (pentamethylcyclopentadienyl)(propylcyclopentadienyl)MX$_2$; (propylcyclopentadienyl)(tetramethylcyclopentadienyl)MX$_2$; (butylcyclopentadienyl)(tetramethylcyclopentadienyl)MX$_2$; bridged (CH$_3$)$_2$Si(indenyl)MX$_2$; bridged (CH$_3$)$_2$Si(4,5,6,7-tetrahydro-indenyl)MX$_2$; (methylcyclopentadienyl)(1,3-dimethyl-4,5,6,7-tetrahydroindenyl)MX$_2$; (propylcyclopentadienyl)$_2$MX$_2$; or (1-methyl-3-butyl-cyclopentadienyl)$_2$MX$_2$; wherein each M is independently zirconium (Zr) or hafnium (Hf); and wherein each X is independently selected from F, Cl, Br, I, —CH$_3$, —CH$_2$CH$_3$, benzyl, —CH$_2$Si (CH$_3$)$_3$, a ($C_1$-$C_5$)alkyl, and a ($C_2$-$C_5$)alkenyl. Alternatively, the metallocene catalyst of the bimodal catalyst system is (propylcyclopentadienyl)(tetramethylcyclopentadienyl)zirconium X$_2$, or bis(butylcyclopentadienyl)zirconium X$_2$, wherein each X independently is as defined above. Each X may be fluoride; alternatively chloride (X$_2$=Cl$_2$); alternatively methyl (X$_2$= (CH$_3$)$_2$); alternatively ethyl. The single-site non-metallocene catalyst that is the ((alkyl-substituted phenylamido)ethyl)amine MX$_2$ may be ((alkyl-substituted phenylamido)ethyl)-amine ZrX$_2$, alternatively bis(2-(pentamethylphenylamido)ethyl)-amine zirconium dibenzyl. Alternatively, the single-site non-metallocene catalyst may be a catalyst of formula (I) of U.S. Pat. No. 6,967,184B2. The bimodal catalyst system may be selected from Bimodal Catalyst System 1 (BMC1), Bimodal Catalyst System 2 (BMC2), and Bimodal Catalyst System 3 (BMC3) described later; alternatively selected from BMC1 and BMC2; alternatively selected from BMC1 and BMC3; alternatively selected from BMC2 and BMC3; alternatively BMC1; alternatively BMC2; alternatively BMC3.

Aspect 6. The method of any one of aspects 1 to 5 wherein the single gas phase polymerization reactor is a floating-bed gas phase polymerization (FB-GPP) reactor and wherein the process conditions comprise (a) to (e): (a) the FB-GPP reactor having a floating resin bed at a bed temperature from 80 to 110 degrees Celsius (° C.); (b) the FB-GPP reactor receiving feeds of respective controlled amounts of fresh ethylene, fresh bimodal catalyst system, fresh ($C_5$-$C_{20}$)alkane(s), optionally fresh hydrogen gas (H$_2$) characterized by a hydrogen-to-ethylene (H$_2$/C$_2$) molar ratio, and optionally fresh alpha-olefin characterized by an alpha-olefin-to-ethylene ($C_x/C_2$) molar ratio; (c) polymerizing in the FB-GPP reactor some of the ethylene and, optionally, the alpha-olefin (if any) with the bimodal catalyst system; (d) discharging from the FB-GPP reactor a gas/vapor mixture ("discharged gas/vapor mixture) comprising vented ($C_5$-$C_{20}$)alkane(s), vented unreacted ethylene, vented unreacted hydrogen gas, if any, and vented unreacted alpha-olefin, if any, wherein the discharged gas/vapor mixture is characterized by a total concentration of the vented ($C_5$-$C_{20}$)alkane(s) therein of from 1.0 to 20.0 mole percent (mol %); and (e) making in the FB-GPP reactor a first bimodal polyethylene polymer having a melt rheology property characterized by a first value; wherein the changing comprises increasing or decreasing the controlled amount of the fresh ($C_4$-$C_{12}$) alkane(s) being fed into the FB-GPP reactor so as to effectively increase or decrease, respectively, the total concentration of the vented ($C_5$-$C_{20}$)alkane(s) in the discharged gas/vapor mixture by at least 1.0 mol %; and after the changing step making a second bimodal polyethylene polymer having the melt rheology property characterized by a second steady-state value, which is lesser than or greater than, respectively, the first steady-state value by at least ±1.0%.

Aspect 7. The method of any one of aspects 1 to 6 wherein any other process condition that could change the melt rheology property value is controlled in such a way so as to not negative (i.e., not completely counteract) the effect of the change in ($C_5$-$C_{20}$)alkane(s) concentration on the melt rheology property value.

Aspect 8. The method of aspect 7 wherein the melt rheology property value is also independently changeable by changing a $H_2/C_2$ molar ratio or bed temperature or both in the GPP reactor, and wherein the $H_2/C_2$ molar ratio and bed temperature are kept constant during the method. Target density and flow index ($I_{21}$) of the bimodal polyethylene polymer may be maintained in some aspects of the method so as to eliminate any changes in density and flow index ($I_{21}$) thereof, which density and flow index ($I_{21}$) changes could confound the MFR5 and melt elasticity results.

Aspect 9. The method of any one of aspects 1 to 6 wherein the melt rheology property value is also independently changeable by changing a $H_2/C_2$ molar ratio or bed temperature or both in the GPP reactor, and wherein the method further comprises changing the $H_2/C_2$ molar ratio and/or bed temperature in such a way so as to add to (enhance) the change in the melt rheology property value made by the change in ($C_5$-$C_{20}$)alkane(s) concentration. For example, if the ($C_5$-$C_{20}$)alkane(s) concentration is decreased, and therefore the melt rheology property value is increased, the $H_2/C_2$ molar ratio and/or bed temperature is/are changed in such a way so as to further increase the melt rheology property value. Conversely, if the ($C_5$-$C_{20}$)alkane(s) concentration is increased, and therefore the melt rheology property value is decreased, the $H_2/C_2$ molar ratio and/or bed temperature is/are changed in such a way so as to further decrease the melt rheology property value.

Aspect 10. The method of any one of aspects 1 to 6 wherein the melt rheology property value is also independently changeable by changing a $H_2/C_2$ molar ratio or bed temperature or both in the GPP reactor, and wherein the method further comprises changing the $H_2/C_2$ molar ratio and/or bed temperature in such a way so as to partially subtract from (partially, but not completely, counteract) the change in the melt rheology property value made by the change in ($C_5$-$C_{20}$) alkane(s) concentration. For example, if the ($C_5$-$C_{20}$) alkane(s) concentration is decreased, and therefore the melt rheology property value is increased, the $H_2/C_2$ molar ratio and/or bed temperature is/are changed in such a way so as to lessen, but not completely prevent, the increase of the melt rheology property value. Conversely, if the ($C_5$-$C_{20}$)alkane(s) concentration is increased, and therefore the melt rheology property value is decreased, the $H_2/C_2$ molar ratio and/or bed temperature is/are changed in such a way so as to lessen, but not completely prevent, the decrease the melt rheology property value.

The changing of the $H_2/C_2$ molar ratio and/or bed temperature may be performed before, during, or after the step of changing of the ($C_5$-$C_{20}$)alkane(s) concentration. The changing of the $H_2/C_2$ molar ratio may also change at least one other property of the bimodal polyethylene polymer, such as weight-average molecular weight ($M_w$), number-average molecular weight ($M_n$), Z-average molecular weight ($M_z$), HMW/LMW components wt/wt split, HMW/LMW components MW spread in a plot of dW/d Log(MW) on the y-axis versus Log(MW) on the x-axis, flow index ($I_{21}$), or density. The changing of the bed temperature may also change at least one other property of the bimodal polyethylene polymer, such as $M_w$, $M_n$, $M_z$, HMW/LMW components wt/wt split, HMW/LMW components spread, flow index ($I_{21}$), or density.

The inventive method provides a new procedure for changing the melt rheology property of the bimodal polyethylene polymer by manipulating a process variable (namely changing alkane(s) concentration) in a polymerization reactor. Because the changing of alkane(s) concentration is an independent result effective variable for changing the melt rheology property, the inventive method enables the melt rheology property value to be changed without needing to change other process conditions ($H_2/C_2$ molar ratio and/or bed temperature). Complications or unwanted effects on polymer properties that might arise from the changing of the other process conditions can be avoided. Thus, the inventive method provides a new process control "knob" or "dial"—control of alkanes concentration in reactor—that reactor operators can push/pull or turn (e.g., by controlling alkanes feed flow into the reactor) to adjust melt rheology properties of bimodal polyethylene polymer being made in a single GPP reactor. The method is effective whether the alkanes concentration in the reactor is being adjusted from a higher value to a lower value or from a lower value to a higher value.

Another process condition that could change the melt rheology property value may be controlled in such a way so as to not negative (i.e., not completely counteract) the effect of the change in ($C_5$-$C_{20}$)alkane(s) concentration on the melt rheology property value.

Alternatively, the inventive method may be used in an inventive combination method with also changing the other process condition. For example, if changing the other process condition would change both the melt rheology property value and a value of a different property (e.g., density or Mw), the inventive method may be used to counteract the effect of changing the other process condition on the melt rheology property value. This combination method may be used to bring about a change in the value of the different property while either keeping the melt rheology property value constant or attenuating the change in the melt rheology property value.

Non-inventive methods of changing a melt rheology property value of a bimodal polyethylene polymer include post-polymerization/post-reactor methods. For example, a non-inventive method may change the melt rheology property value of the bimodal polyethylene polymer only by any one of (i) to (v): changing the $H_2/C_2$ molar ratio; (ii) changing bed temperature; (iii) post-reactor melt blending of a rheology modifier thereinto; (iv) by post-reactor crosslinking of the bimodal polyethylene polymer; and (v) a combination of any two or more of (i) to (iv). The inventive method may further comprise any one of non-inventive methods (i) to (v) for further changing the melt rheology property value of the bimodal polyethylene polymer. Alternatively, the inventive method may exclude any one of non-inventive methods (i) to (v).

The bimodal catalyst system may be characterized by an inverse response to bed temperature such that when the bed temperature is increased, the melt rheology property value of the resulting bimodal polyethylene polymer is decreased, and when the bed temperature is decreased, the melt rheology property value of the resulting bimodal polyethylene polymer is increased. The bimodal catalyst system may be characterized by an inverse response to $H_2/C_2$ molar ratio such that when the $H_2/C_2$ molar ratio is increased, the melt rheology property value of the resulting bimodal polyethylene polymer is decreased, and when the $H_2/C_2$ molar ratio is decreased, the melt rheology property value of the resulting bimodal polyethylene polymer is increased. In aspect 9, when the $(C_5-C_{20})$alkane(s) concentration is increased the bed temperature and/or $H_2/C_2$ molar ratio may also be increased to add to the decrease in the melt rheology property value; or, conversely, when the $(C_5-C_{20})$alkane(s) concentration is decreased the bed temperature and/or $H_2/C_2$ molar ratio may also be decreased to add to the increase in the melt rheology property value. In aspect 10, when the $(C_5-C_{20})$alkane(s) concentration is increased the bed temperature and/or $H_2/C_2$ molar ratio may be decreased to partially subtract from (but not completely counteract) the decrease in the melt rheology property value; or, conversely, when the $(C_5-C_{20})$alkane(s) concentration is decreased the bed temperature and/or $H_2/C_2$ molar ratio may be increased to partially subtract from (but not completely counteract) the increase in the melt rheology property value.

The bimodal polyethylene polymers being made before or after the changing $(C_5-C_{20})$alkane(s) concentration step (e.g., the first and second bimodal polyethylene polymers) are independently characterized by a bimodal weight-average molecular weight distribution (bimodal $M_w$ distribution) as determined by gel permeation chromatography (GPC) measured according to the Bimodality Test Method, described later. For example, the bimodal $M_w$ distribution is not trimodal or tetramodal. The bimodal polyethylene polymer may be characterized by a two peaks separated by a distinguishable local minimum therebetween in a plot of dW/d Log(MW) on the y-axis versus Log(MW) on the x-axis to give a Gel Permeation Chromatograph (GPC) chromatogram, wherein Log(MW) and dW/d Log(MW) are as defined herein and are measured by Gel Permeation Chromatograph (GPC) Test Method (Examples).

The bimodal polyethylene polymer may be a bimodal polyethylene homopolymer or a bimodal ethylene/alpha-olefin copolymer. The alpha-olefin used to make the bimodal ethylene/alpha-olefin copolymer may be a $(C_3-C_{20})$alpha-olefin, alternatively a $(C_4-C_8)$alpha-olefin; alternatively 1-butene, 1-hexene, or 1-octene; alternatively 1-butene or 1-hexene; alternatively 1-butene; alternatively 1-hexene; alternatively 1-octene; alternatively a combination of at least two of 1-butene, 1-hexene, and 1-octene. The bimodal polyethylene polymer may be a bimodal ethylene-co-1-butene copolymer or a bimodal ethylene-co-1-hexene copolymer.

The bimodal polyethylene polymers independently may be characterized by any one of property limitations (i) to (vi): (i) the density is from 0.935 to 0.954 g/cm³, alternatively 0.9450 to 0.9540 g/cm³, alternatively 0.9460 to 0.9500 g/cm³, alternatively 0.9467 to 0.9491 g/cm³, measured according to ASTM D792-13, Method B; (ii) the component fraction split is characterized by a weight fraction of the HMW component from 32.2 to 58.5 wt %; and a weight fraction of the LMW component fraction from 67.8 to 41.5 wt %, respectively, of the combined weight of the HMW and LMW components, measured according to the GPC Test Method; (iii) the molecular mass dispersity ($M_w/M_n$), $Đ_M$, is from 13.8 to 40.3, wherein $M_w$ and $M_n$ are measured according to the GPC Test Method; (iv) the (a) MFR$_5$ is from 9 to 37.6, alternatively from 20.5 to 29.4; (v) a combination of any three of (i) to (iv); and (vi) each of (i) to (iv).

The bimodal polyethylene polymers independently may be characterized by any one of property limitations (i) to (vii): (i) a high load melt index from 5 to 11 g/10 min., alternatively from 8 to 11 g/10 min., measured according to ASTM D1238-13 (190° C., 21.6 kg, HLMI or $I_{21}$); (ii) a melt flow index-5 ($I_5$) from 0.16 to 0.50 g/10 min., alternatively from 0.30 to 0.50 g/10 min., measured according to ASTM D1238-13 (190° C., 21.6 kg, "$I_{21}$"; and 190° C., 5.0 kg, "$I_5$", respectively); (iii) a melt elasticity G'/G" (0.1 radians per second) of from 0.35 to 0.54, measured according to the Melt Elasticity Test Method; (iv) both (i) and (ii); (v) both (i) and (iii); (vi) both (ii) and (iii); and (vii) each of (i) to (iii).

The bimodal polyethylene polymer is not a physical blend or melt blend of two different, separately-made polymers.

GENERAL DEFINITIONS

Activator. Substance, other than a catalyst or monomer, that increases the rate of a catalyzed reaction without itself being consumed. May contain aluminum and/or boron.

Bimodal. Two, and only two, modalities or modes.

Bimodal in reference to a polymer (e.g., the bimodal polyethylene polymer) means a composition consisting essentially of a higher molecular weight component and a lower molecular weight component, which components are characterized by two peaks separated by a distinguishable local minimum therebetween in a plot of dW/d Log(MW) on the y-axis versus Log(MW) on the x-axis to give a Gel Permeation Chromatograph (GPC) chromatogram, wherein Log(MW) and dW/d Log(MW) are as defined herein and are measured by Gel Permeation Chromatograph (GPC) Test Method described herein.

Bimodal when referring to a catalyst system (e.g., the bimodal catalyst system) means a catalyst system that contains two different catalysts for catalyzing a same polymerization process (e.g., olefin polymerization) and producing a bimodal polymer composition. Two catalysts are different if they differ from each other in at least one of the following characteristics: (a) their catalytic metals are different (Ti versus Zr, Zr versus Hf, Ti versus Hf; not activator metals such as Al); (b) one catalyst has a functional ligand covalently bonded to its catalytic metal and the other catalyst is free of functional ligands bonded to its catalytic metal; (c) both catalysts have functional ligands covalently bonded to their catalytic metal and the structures of at least one of functional ligand of one of the catalysts is different than the structure of each of the functional ligand(s) of the other catalyst (e.g., cyclopentadienyl versus propylcyclopentadienyl or butylcyclopentadienyl versus pentamethylphenylamido)ethyl)amine; and (d) for catalysts disposed on a support material, the compositions of the support materials are different. Functional ligands do not include leaving groups X as defined herein. A bimodal catalyst system may be unsupported or supported on a support material. The two catalysts of a bimodal catalyst system may be disposed on the same support material, either on the same particles of the same support material or each on different particles of the same support material. The same catalyst in terms of catalytic metal and ligands wherein a portion thereof is disposed on a support material and a different portion thereof is dissolved in an inert solvent, the different portions do not by themselves constitute a bimodal catalyst system.

Catalyst. A material that enhances rate of a reaction (e.g., the polymerization of ethylene and 1-hexene) and is not completely consumed thereby.

Catalyst system. A combination of a catalyst per se and a companion material such as a modifier compound for attenuating reactivity of the catalyst, a support material on which the catalyst is disposed, a carrier material in which the catalyst is disposed, or a combination of any two or more thereof, or a reaction product of a reaction thereof.

Dry. Generally, a moisture content from 0 to less than 5 parts per million based on total parts by weight. Materials fed to the reactor(s) during a polymerization reaction are dry.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Metallocene catalyst. Homogeneous or heterogeneous material that contains a cyclopentadienyl ligand-metal complex and enhances olefin polymerization reaction rates. Substantially single site or dual site. Each metal is a transition metal Ti, Zr, or Hf. Each cyclopentadienyl ligand independently is an unsubstituted cyclopentadienyl group or a hydrocarbyl-substituted cyclopentadienyl group. The metallocene catalyst may have two cyclopentadienyl ligands, and at least one, alternatively both cyclopentenyl ligands independently is a hydrocarbyl-substituted cyclopentadienyl group. Each hydrocarbyl-substituted cyclopentadienyl group may independently have 1, 2, 3, 4, or 5 hydrocarbyl substituents. Each hydrocarbyl substituent may independently be a ($C_1$-$C_4$)alkyl. Two or more substituents may be bonded together to form a divalent substituent, which with carbon atoms of the cyclopentadienyl group may form a ring.

Single-site catalyst. An organic ligand-metal complex useful for enhancing rates of polymerization of olefin monomers and having at most two discreet binding sites at the metal available for coordination to an olefin monomer molecule prior to insertion on a propagating polymer chain.

Single-site non-metallocene catalyst. A substantially single-site or dual site, homogeneous or heterogeneous material that is free of an unsubstituted or substituted cyclopentadienyl ligand, but instead has one or more functional ligands such as bisphenyl phenol or carboxamide-containing ligands.

Ziegler-Natta catalysts. Heterogeneous materials that enhance olefin polymerization reaction rates and are prepared by contacting inorganic titanium compounds, such as titanium halides supported on a magnesium chloride support, with an activator.

Polymerization Reactor and Method

In an illustrative pilot plant process for making the bimodal polyethylene polymer, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of the bimodal polyethylene polymer. Configure the FB-GPP reactor with a recycle gas line for flowing a recycle gas stream. Fit the FB-GPP reactor with gas feed inlets and polymer product outlet. Introduce gaseous feed streams of ethylene and hydrogen together with comonomer (e.g., 1-hexene) below the FB-GPP reactor bed into the recycle gas line. Measure the ($C_5$-$C_{20}$)alkane(s) concentration in the gas/vapor effluent by sampling the gas/vapor effluent in the recycle gas line. Return the gas/vapor effluent (other than a small portion removed for sampling) to the FB-GPP reactor via the recycle gas line.

Polymerization operating conditions are any variable or combination of variables that may affect a polymerization reaction in the GPP reactor or a composition or property of a bimodal polyethylene polymer made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In operating the method, control individual flow rates of ethylene ("$C_2$"), hydrogen ("$H_2$") and any alpha-olefin (e.g., 1-hexene or "$C_6$" or "$C_x$" wherein x is 6) to maintain a fixed comonomer to ethylene monomer gas molar ratio ($C_x/C_2$, e.g., $C_6/C_2$) equal to a described value (e.g., 0.00560 or 0.00703), a constant hydrogen to ethylene gas molar ratio ("$H_2/C_2$") equal to a described value (e.g., 0.0042 or 0.0048), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT. Maintain the fluidized bed at a constant height by withdrawing a portion of the bed at a rate equal to the rate of production of particulate form of the bimodal polyethylene polymer, which production rate may be from 10 to 20 kilograms per hour (kg/hr), alternatively 13 to 18 kg/hr. Remove the product bimodal polyethylene polymer semi-continuously via a series of valves into a fixed volume chamber, wherein this removed bimodal polyethylene polymer is purged to remove entrained hydrocarbons and treated with a stream of humidified nitrogen ($N_2$) gas to deactivate any trace quantities of residual catalyst.

The bimodal catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil or the ($C_5$-$C_{20}$)alkane(s).

The ($C_5$-$C_{20}$)alkane(s) may be fed separately into the FB-GPP reactor or as part of a mixture also containing the bimodal catalyst system. The ($C_5$-$C_{20}$)alkane(s) may be a ($C_{11}$-$C_{20}$)alkane, alternatively a ($C_5$-$C_{10}$)alkane, alternatively a ($C_5$)alkane, e.g., pentane or 2-methylbutane; a hexane; a heptane; an octane; a nonane; a decane; or a combination of any two or more thereof. The $(C_5-C_{20})$ alkane(s) may be may be 2-methylbutane (i.e., isopentane). Aspects of the method that use the $(C_5-C_{20})$alkane(s) may be referred to as being an induced condensing mode operation (ICMO). ICMO is described in U.S. Pat. Nos. 4,453,399; 4,588,790; 4,994,534; 5,352,749; 5,462,999; and 6,489,408. Measure concentration of vented $(C_5-C_{20})$alkane(s) in recycle line using gas chromatography by calibrating peak area percent to mole percent (mol %) with a gas mixture standard of known concentrations of ad rem gas phase components.

The method uses a gas-phase polymerization (GPP) reactor, such as a stirred-bed gas phase polymerization reactor (SB-GPP reactor) or a fluidized-bed gas-phase polymerization reactor (FB-GPP reactor), to make the bimodal polyethylene polymer. Such gas phase polymerization reactors and methods are generally well-known in the art. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions. Start-up or restart may include the use of a polymer seedbed preloaded or loaded, respectively, into the fluidized bed reactor. The polymer seedbed may be composed of powder of a polyethylene such as a polyethylene homopolymer or previously made batch of the bimodal polyethylene polymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively, the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and any alpha-olefin (e.g., 1-hexene). The reagents fed into the fluidized bed reactor include the molecular hydrogen gas and the $(C_5-C_{20})$ alkane(s) and the bimodal catalyst system.

The method may use a pilot scale fluidized bed gas phase polymerization reactor (Pilot Reactor) that comprises a reactor vessel containing a fluidized bed of a powder of the bimodal polyethylene polymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, any alpha-olefin (e.g., 1-hexene), and hydrogen being fed into the Pilot Reactor are monitored by an in-line gas chromatograph in the cycle loop in order to maintain specific concentrations that define and enable control of polymer properties. The bimodal catalyst system may be fed as a slurry or dry powder into the Pilot Reactor from high pressure devices, wherein the slurry is fed via a syringe pump and the dry powder is fed via a metered disk. The bimodal catalyst system typically enters the fluidized bed in the lower ⅓ of its bed height. The Pilot Reactor further comprises a way of weighing the fluidized bed and isolation ports (Product Discharge System) for discharging the powder of bimodal polyethylene polymer from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Michigan, USA.

Catalysts, Support Materials, Activators

The bimodal catalyst system used in the method consists essentially of a metallocene catalyst and a non-metallocene molecular catalyst, which are different in functional ligand and/or catalytic metal M. The phrase consists essentially of means that the bimodal catalyst system and method using same is free of a third single-site catalyst and free of non-single site catalysts. The non-single site catalysts omitted from the bimodal catalyst system and method include chromium-containing olefin polymerization catalysts and Ziegler-Natta catalysts. The bimodal catalyst system may also consist essentially of a solid support material and/or at least one activator and/or at least one activator species, which is a by-product of reacting the metallocene catalyst or non-metallocene molecular catalyst with the first activator. The metallocene catalyst of the bimodal catalyst system may be (propylcyclopentadienyl)(tetramethylcyclopentadienyl) zirconium dimethyl or bis(butylcyclopentadienyl)zirconium dimethyl; and the non-metallocene molecular catalyst of the bimodal catalyst system may be bis(2-(pentamethylphenylamido)ethyl)amine zirconium dibenzyl.

Without being bound by theory, it is believed that the single-site non-metallocene catalyst (e.g., the bis(2-(pentamethylphenylamido)ethyl)amine zirconium dibenzyl) is effective for making the HMW component of the bimodal polyethylene polymer and the metallocene catalyst (e.g., the (propylcyclopentadienyl)(tetramethylcyclopentadienyl)zirconium dimethyl or bis(butylcyclopentadienyl)zirconium dimethyl) is independently effective for making the LMW component of the bimodal polyethylene polymer. The molar ratio of the two catalysts of the bimodal catalyst system may be based on the molar ratio of their respective catalytic metal atom (M, e.g., Zr) contents, which may be calculated from ingredient weights thereof or may be analytically measured.

The catalysts of the bimodal catalyst system may be disposed by spray-drying onto a solid support material prior to being contacted with an activator. The solid support material may be uncalcined or calcined prior to being contacted with the catalysts. The solid support material may be a hydrophobic fumed silica (e.g., a fumed silica treated with dimethyldichlorosilane). The bimodal (unsupported or supported) catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from several sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, these silicas are not calcined (i.e., not dehydrated). Silica that is calcined prior to purchase may also be used as the support material.

Prior to being contacted with a catalyst, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. The support material may be a calcined support material.

The method may further employ a trim catalyst. The trim catalyst may be any one of the aforementioned metallocene catalysts. For convenience the trim catalyst is fed in solution in a hydrocarbon solvent (e.g., mineral oil or heptane). The hydrocarbon solvent may be the ($C_5$-$C_{20}$)alkane(s). The trim catalyst may be the same as the metallocene catalyst of the bimodal catalyst system and may be used to vary, within limits, the amount of the metallocene catalyst used in the method relative to the amount of the single-site non-metallocene catalyst of the bimodal catalyst system.

Each catalyst of the bimodal catalyst system is activated by contacting it with an activator. Any activator may be the same or different as another and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropylaluminoxane, or a modified methylaluminoxane (MMAO). Each alkyl of the alkylaluminum or alkylaluminoxane independently may be a ($C_1$-$C_7$)alkyl, alternatively a ($C_1$-$C_6$) alkyl, alternatively a ($C_1$-$C_4$)alkyl. The molar ratio of activator's metal (Al) to a particular catalyst compound's metal (catalytic metal, e.g., Zr) may be 1000:1 to 0.5:1, alternatively 300:1 to 1:1, alternatively 150:1 to 1:1. Suitable activators are commercially available.

Once the activator and the catalysts of the bimodal catalyst system contact each other, the catalysts of the bimodal catalyst system are activated and activator species may be made in situ. The activator species may have a different structure or composition than the catalyst and activator from which it is derived and may be a by-product of the activation of the catalyst or may be a derivative of the by-product. The corresponding activator species may be a derivative of the Lewis acid, non-coordinating ionic activator, ionizing activator, Lewis base, alkylaluminum, or alkylaluminoxane, respectively. An example of the derivative of the by-product is a methylaluminoxane species that is formed by devolatilizing during spray-drying of a bimodal catalyst system made with methylaluminoxane.

Each contacting step between activator and catalyst independently may be done either (a) in a separate vessel outside the GPP reactor (e.g., outside the FB-GPP reactor), (b) in a feed line to the GPP reactor, and/or (c) inside the GPP reactor (in situ). In option (a) the bimodal catalyst system, once its catalysts are activated, may be fed into the GPP reactor as a dry powder, alternatively as a slurry in a non-polar, aprotic (hydrocarbon) solvent. In option (c) the bimodal catalyst system may be fed into the reactor prior to activation via a first feed line, the activator may be fed into the reactor via a second feed line, the trim catalyst, if any, may be fed into the reactor via a third feed line, and a second activator may be feed into the reactor via a fourth feed line. Any two of the first to fourth feed lines may be the same or different. The activator(s) may be fed into the reactor in "wet mode" in the form of a solution thereof in an inert liquid such as mineral oil or toluene, in slurry mode as a suspension, or in dry mode as a powder. Each contacting step may be done in separate vessels, feed lines, or reactors at the same or different times, or in the same vessel, feed line, or reactor at different times, to separately give the bimodal catalyst system and trim catalyst. Alternatively, the contacting steps may be done in the same vessel, feed line, or reactor at the same time to give a mixture of the bimodal catalyst system and trim catalyst in situ.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). PAS is Publicly Available Specification, Deutsches Institut für Normunng e.V. (DIN, German Institute for Standardization) Properties may be measured using standard test methods and conditions. Ranges include endpoints, subranges, and whole and/or fractional values subsumed therein, except a range of integers does not include fractional values. Room temperature: 23° C.±1° C.

EXAMPLES

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the bimodal polyethylene polymer by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (4). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}=0.67$, $K_{PS}=0.000175$, and $a_X$ and $K_X$ are obtained from published literature. For polyethylenes, $a_X/K_X=0.695/0.000579$. For polypropylenes $a_X/K_X=0.705/0.0002288$. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs to [0341]. Plot of dW/d Log(MW) on the y-axis versus Log(MW) on the x-axis to give a GPC chromatogram, wherein Log(MW) and dW/d Log(MW) are as defined above.

High Load Melt Index (HLMI) $I_{21}$ Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index ("$I_2$") Test Method: for ethylene-based (co) polymer is measured according to ASTM D1238-13, using conditions of 190° C./2.16 kg, formerly known as "Condition E".

Melt Index $I_5$ ("$I_5$") Test Method: use ASTM D1238-13, using conditions of 190° C./5.0 kg. Report results in units of grams eluted per 10 minutes (g/10 min.).

Melt Flow Ratio MFR$_2$: ("$I_{21}/I_2$") Test Method: calculated by dividing the value from the HLMI $I_{21}$ Test Method by the value from the Melt Index 12 Test Method.

Melt Flow Ratio MFR5: ("$I_{21}/I_5$") Test Method: calculated by dividing the value from the HLMI $I_{21}$ Test Method by the value from the Melt Index $I_5$ Test Method.

Melt Elasticity Test Method: On a polymer melt at 190° C., perform small-strain (10%) oscillatory shear at varying frequency from 100 radians per second (rad/s) to 0.1 rad/s using an ARES-G2 Advanced Rheometric Expansion System from TA Instruments, with parallel-plate geometry. Obtain the G'/G" ratio value at a dynamic frequency of 0.1 rad/s (G'/G" (0.1 radian per second), wherein G' is elastic (storage) modulus and G" is viscous (loss) modulus)

Antioxidant: 1. Pentaerythritol tetrakis(3-(3,5-di(1',1'-dimethylethyl)-4-hydroxyphenyl)propionate); obtained as IRGANOX 1010 from BASF.

Antioxidant 2. Tris(2,4-di(1',1'-dimethylethyl)-phenyl) phosphite. Obtained as IRGAFOS 168 from BASF.

Catalyst Neutralizer: 1. Calcium stearate.

Bimodal Catalyst System 1 (BMC1): a spray-dried catalyst formulation prepared from Cabosil™ TS-610, methylalumoxane, bis(2-(pentamethylphenylamido)ethyl)amine zirconium dibenzyl, and (propylcyclopentadienyl)(tetramethylcyclopentadienyl)zirconium dimethyl. Available commercially as BMC-200 from Univation Technologies, LLC, Houston, Texas, USA, a wholly-owned entity of The Dow Chemical Company, Midland, Michigan, USA.

Bimodal Catalyst System 2 (BMC2): a spray-dried catalyst formulation prepared from Cabosil™ TS-610, methylalumoxane, bis(2-(pentamethylphenylamido)ethyl)amine zirconium dibenzyl and bis(butylcyclopentadienyl)zirconium dimethyl. Available commercially as BMC-300 from Univation Technologies, LLC, Houston, Texas, USA, a wholly-owned entity of The Dow Chemical Company, Midland, Michigan, USA.

Bimodal Catalyst System 3 (BMC3): a spray-dried catalyst formulation prepared from Cabosil™ TS-610, methylalumoxane, bis(2-(pentamethylphenylamido)ethyl)amine zirconium dibenzyl and (1,3-dimethyl-3,4,5,6-tetramethylindenyl)(1-methylcyclopentadienyl)zirconium dimethyl.

($C_5$-$C_{20}$)alkane(s): isopentane, i.e., 2-methylbutane
Comonomer: 1-butene or $H_2C=C(H)(CH_2)CH_3$.
Comonomer: 1-hexene or $H_2C=C(H)(CH_2)_3CH_3$.
Ethylene ("$C_2$"): $CH_2=CH_2$.
Molecular hydrogen gas: $H_2$.

Inventive Example 1a and 1b (IE1a and IE1b): polymerization procedure. Two runs in a semi-commercial scale reactor with the Bimodal Catalyst System 1 (BMC1) and comonomer 1-hexene according to the method described earlier adjusting the isopentane concentration to give two embodiments of the bimodal polyethylene polymer as granular resins. The polymerization operating conditions are reported in Table 1.

Inventive Example 1c to 1h (IE1c to IE1h): polymerization procedure. Six runs in a semi-commercial scale reactor with the Bimodal Catalyst System 1 (BMC1) and comonomer 1-hexene according to the method described earlier adjusting the isopentane concentration to give two embodiments of the bimodal polyethylene polymer as granular resins. The polymerization operating conditions are reported in Table 1A, which follows Table 1.

Inventive Example 2a to 2c (IE2a to IE2c): polymerization procedure. Three runs in a pilot plant reactor used Bimodal Catalyst System 2 (BMC2), and comonomer 1-butene according to the method described earlier adjusting the isopentane concentration to give three embodiments of the bimodal polyethylene polymer as granular resins. Polymerization operating conditions are reported in Table 1.

Inventive Example 3a and 3b (IE3a and IE3b): polymerization procedure. Two runs in a pilot plant reactor used Bimodal Catalyst System 2 (BMC2), and comonomer 1-butene according to the method described earlier adjusting the isopentane concentration to give two embodiments of the bimodal polyethylene polymer as granular resins. Polymerization operating conditions are reported in Table 1.

Inventive Example 4a and 4b (IE4a and IE4b): polymerization procedure. Two runs in a pilot plant reactor used Bimodal Catalyst System 3 (BMC3), and comonomer 1-hexene according to the method described earlier adjusting the isopentane concentration to give two embodiments of the bimodal polyethylene polymer as granular resins. Polymerization operating conditions are reported in Table 1.

TABLE 1

Operating conditions for IE1a, IE1b, and IE2a to IE4b.

| | IE1a & IE1b | IE2a, IE2b, IE2c | IE3a & IE3b | IE4a & IE4b |
|---|---|---|---|---|
| Reactor Type | S, CM, FB GPP* | S, CM, FB GPP | S, CM, FB GPP | S, CM, FB GPP* |
| Reactor Purging gas | Anhydrous $N_2$ | Anhydrous $N_2$ | Anhydrous $N_2$ | Anhydrous $N_2$ |
| Bed Temp. (° C.) | 100.0 | 90.0 | 97.0 | 100.0 |
| Rx Pressure (kpa)^ | 2413 | 2413 | 2413 | 2413 |
| $C_2$ Partial Pressure (kpa) | 1517 | 1517 | 1517 | 1517 |

TABLE 1-continued

Operating conditions for IE1a, IE1b, and IE2a to IE4b.

|  | IE1a & IE1b | IE2a, IE2b, IE2c | IE3a & IE3b | IE4a & IE4b |
|---|---|---|---|---|
| $H_2/C_2$ Molar Ratio | 0.0040 | 0.0042 | 0.0048 | 0.0023 |
| Comonomer | 1-hexene | 1-butene | 1-butene | 1-hexene |
| $C_4/C_2$ Molar Ratio | Not applicable | 0.0132 to 0.0136 | 0.0125 | Not applicable |
| $C_6/C_2$ Molar Ratio | 0.0089 | Not applicable | Not applicable | 0.0052 to 0.0056 |
| $(C_5-C_{20})$alkane(s) Composition | 2-methylbutane | 2-methylbutane | 2-methylbutane | 2-methylbutane |
| Total $(C_5-C_{20})$ alkane(s) concentration in recycle gas line (mol %) | 6.54 then 17.05 | 13.90 then 11.16 then 5.25 | 13.98 then 11.15 | 11.4 then 15 |
| Superficial Gas Velocity (m/sec) | 0.55 | 0.64 | 0.58 | 0.55 |
| Bimodal Catalyst System | BMC1 | BMC2 | BMC2 | BMC3 |
| Starting seedbed = granular HDPE resin | Preloaded | Preloaded | Preloaded | Preloaded |
| Fluidized Bed Weight (kg) | 50 | 54 | 54 | 46 |
| Copolymer composition Production Rate (kg/hour) | 17 | 18 | 19 | 18 |
| Copolymer composition Residence Time (hour) | 3.0 | 3.1 | 2.9 | 2.5 |

*S, CM, FB, GPP: single, continuous mode, fluidized bed gas phase polymerization.
^Rx Pressure (kPa): reactor total pressure in kilopascals.

TABLE 1A

Operating conditions for IE1c to 1h.

|  | IE1c & IE1d | IE1e & IE1f | IE1g & IE1h |
|---|---|---|---|
| Reactor Type | S, CM, FB GPP* | S, CM, FB GPP | S, CM, FB GPP |
| Reactor Purging gas | Anhydrous $N_2$ | Anhydrous $N_2$ | Anhydrous $N_2$ |
| Bed Temp. (° C.) | 85 | 105 | 105 |
| Rx Pressure (kpa)^ | 1813 | 2413 | 1813 |
| $C_2$ Partial Pressure (kpa) | 1531 | 1517 | 1522 |
| $H_2/C_2$ Molar Ratio | 0.0041 | 0.0020 | 0.0020 |
| Comonomer | 1-hexene | 1-hexene | 1-hexene |
| $C_4/C_2$ Molar Ratio | Not applicable | Not applicable | Not applicable |
| $C_6/C_2$ Molar Ratio | 0.0049 to 0.0052 | 0.0050 | 0.0045 to 0.0046 |
| $(C_5-C_{20})$alkane(s) Composition | 2-methylbutane | 2-methylbutane | 2-methylbutane |
| Total $(C_5-C_{20})$alkane(s) concentration in recycle gas line (mol %) | 5.23 then 11.26 | 10.40 then 15.05 | 10.69 then 15.16 |
| Superficial Gas Velocity (m/sec) | 0.55 | 0.64 | 0.58 |
| Bimodal Catalyst System | BMC1 | BMC1 | BMC1 |
| Starting seedbed = granular HDPE resin | Preloaded | Preloaded | Preloaded |
| Fluidized Bed Weight (kg) | 16,727 | 43 | 14,703 |
| Copolymer composition Production Rate (kg/hour) | 5,434 | 16 | 4,595 |
| Copolymer composition Residence Time (hour) | 3.1 | 2.7 | 3.2 |

*S, CM, FB, GPP: single, continuous mode, fluidized bed gas phase polymerization.
^Rx Pressure (kPa): reactor total pressure in kilopascals.

Formulation and Pelletization Procedure: Each of the different granular resins of IE1a to IE4b was separately mixed with 1,500 parts per million weight/weight (ppm) of Antioxidant 1,500 ppm Antioxidant 2, and 1,000 ppm Catalyst Neutralizer 1 in a ribbon blender, and then compounded into strand cut pellets using a twin-screw extruder Coperion ZSK-40. The resulting pellets of each resin were tested for melt properties of HLMI ($I_{21}$), $I_5$ (5.0 kg), MFR5 ($I_{21}/I_5$), and melt elasticity according to the aforementioned respective test methods. Results are reported below in Tables 2 to 4.

The bimodal polyethylene polymer may further comprise at least one antioxidant selected from Antioxidants 1 and 2; at least one catalyst neutralizer selected from Catalyst Neutralizer 1; or a combination thereof.

TABLE 2

Melt properties of bimodal polyethylene polymers of IE1a to IE1h.

| Test | IE1a | IE1b | IE1c | IE1d | IE1e | IE1d | IE1g | IE1h |
|---|---|---|---|---|---|---|---|---|
| Concentration of $(C_5-C_{20})$alkane(s) (includes isopentane) | 6.54 | 17.05 | 5.23 | 11.26 | 10.40 | 15.05 | 10.69 | 15.16 |
| MFR5 $(I_{21}/I_5)$ | 27.51 | 26.32 | 35.8 | 33.1 | 35.3 | 33.7 | 37.61 | 35.99 |
| G'/G" (0.1 radian per second) | 0.45 | 0.43 | N/m* | N/m | N/m | N/m | N/m | N/m |
| Density (g/cm³) | 0.9479 | 0.9467 | 0.9484 | 0.9490 | 0.9504 | 0.9493 | 0.9484 | 0.9488 |

N/m means not measured.

TABLE 3

Melt properties of bimodal polyethylene polymers of IE2a to IE2c.

| Test | IE2a | IE2b | IE2c |
|---|---|---|---|
| Concentration of $(C_5-C_{20})$ alkane(s) (includes isopentane) | 13.90 | 11.16 | 5.25 |
| MFR5 $(I_{21}/I_5)$ | 23.72 | 26.87 | 29.01 |
| G'/G" (0.1 radian per second) | 0.43 | 0.49 | 0.51 |
| Density (g/cm³) | 0.9488 | 0.9488 | 0.9491 |

TABLE 4

Melt properties of bimodal polyethylene polymers of IE3a to IE4b.

| Test | IE3a | IE3b | IE4a | IE4b |
|---|---|---|---|---|
| Concentration of $(C_5-C_{20})$ alkane(s) (includes isopentane) | 13.98 | 11.15 | 15 | 11.4 |
| MFR5 $(I_{21}/I_5)$ | 20.86 | 21.60 | 29.52 | 30.27 |
| Melt elasticity (G'/G") (0.1 radian per second)) | 0.39 | 0.41 | N/m | N/m |
| Density (g/cm³) | 0.9490 | 0.9491 | 0.9488 | 0.9484 |

Comparing IE1a and IE1b demonstrates the inventive method; comparing IE1c and IE1d demonstrates the method; comparing IE1e and IE1f demonstrates the method; comparing IE1g and IE1h demonstrates the method; comparing IE2a to IE2c demonstrates the inventive method; comparing IE3a and IE3b demonstrates the method; and comparing IE4a and IE4b demonstrates the method.

As shown in Tables 2 to 4, the Examples demonstrate the method of independently changing a melt rheology property value of a bimodal polyethylene polymer being made using a bimodal catalyst system in a single gas phase polymerization reactor under process conditions comprising $(C_5-C_{20})$alkane(s) in the reactor. The method comprises changing concentration of the $(C_5-C_{20})$alkane(s) in the reactor. The $(C_5-C_{20})$alkane(s) in these experiments was isopentane (2-methylbutane). The amount of change in $(C_5-C_{20})$alkane(s) concentration was sufficient to effect measurable changes in the melt rheology property values for MFR5 and melt elasticity. The bimodal catalyst systems are characterized by inverse response to $(C_5-C_{20})$alkane(s) concentration such that in Table 2 when the $(C_5-C_{20})$alkane(s) concentration was increased from run to run, the melt rheology property values of the resulting bimodal polyethylene polymer decreased, and conversely in Tables 3 and 4 when the $(C_5-C_{20})$alkane(s) concentration was decreased from run to run, the melt rheology property values of the resulting bimodal polyethylene polymer increased. Other process conditions that could change the melt rheology property, namely the $H_2/C_2$ molar ratio and reactor bed temperature, were controlled in such a way so as to not negative the effect of the change in $(C_5-C_{20})$alkane(s) concentration on the melt rheology property value. Also, target density and flow index $(I_{21})$ of the bimodal polyethylene polymer may be maintained so as to eliminate any changes in density and flow index $(I_{21})$ thereof, which density and flow index $(I_{21})$ changes could confound the MFR5 and melt elasticity results.

The Examples demonstrate the inventive method provides a new procedure for changing the melt rheology property value of the bimodal polyethylene polymer by manipulating a process variable (namely changing alkane(s) concentration) in a polymerization reactor. Because the changing of alkane(s) concentration is an independent result effective variable for changing the melt rheology property, the inventive method enables the melt rheology property value to be changed without needing to change other process conditions (such as $H_2/C_2$ molar ratio and/or bed temperature). Complications or unwanted effects on polymer properties that might arise from the changing of the other process conditions can be avoided. Thus, the inventive method provides a new process control "knob" or "dial"—control of alkanes concentration in reactor—that reactor operators can push/pull or turn to adjust (e.g., by controlling alkanes feed flow into the reactor) melt rheology properties of bimodal polyethylene polymer being made in a single GPP reactor. The examples demonstrate that the method is effective whether the alkanes concentration in the reactor is being adjusted from a higher value to a lower value or from a lower value to a higher value.

The invention claimed is:

1. A method of independently changing a melt rheology property value of a bimodal polyethylene polymer being made using a bimodal catalyst system in a single gas phase polymerization (GPP) reactor under process conditions comprising $(C_5-C_{20})$alkane(s) in the GPP reactor, wherein the bimodal polyethylene polymer comprises a higher molecular weight (HMW) component and a lower molecular weight (LMW) component, wherein the bimodal catalyst system consists essentially of a metallocene catalyst and a single-site non-metallocene catalyst and the bimodal catalyst system is characterized by an inverse response to $(C_5-C_{20})$alkane(s) concentration such that when the $(C_5-C_{20})$alkane(s) concentration is increased, the melt rheology property value of a resulting bimodal polyethylene polymer is decreased, and when the $(C_5-C_{20})$alkane(s) concentration is decreased, the melt rheology property value of a resulting bimodal polyethylene polymer is increased; the method comprising:

changing concentration of the $(C_5-C_{20})$alkane(s) in the GPP reactor by an amount sufficient to effect a measurable change in the melt rheology property value; wherein any other process condition that could change the melt rheology property value is controlled in such a way so as to not negate an effect of the change in $(C_5-C_{20})$alkane(s) concentration on the melt rheology property value; and feeding into the GPP reactor a controlled amount of fresh quantity of ethylene, fresh quantity of the bimodal catalyst system, fresh quantity of the $(C_5-C_{20})$ alkane(s), optionally fresh quantity of hydrogen gas $(H_2)$, if any, characterized by a hydrogen-to-ethylene $(H_2/C_2)$ molar ratio, and optionally fresh quantity of an alpha-olefin, if any, characterized by an alpha-olefin-to-ethylene $(C_x/C_2)$ molar ratio; polymerizing in the GPP reactor some of the ethylene and, optionally, the alpha-olefin (if any) with the bimodal catalyst system; discharging from the GPP reactor a gas/vapor mixture ("discharged gas/vapor mixture) comprising vented $(C_5-C_{20})$alkane(s), vented unreacted ethylene, vented unreacted hydrogen gas, if any, and vented unreacted alpha-olefin, if any, wherein the discharged gas/vapor mixture is characterized by a total concentration of the vented $(C_5-C_{20})$alkane(s) therein of from 1.0 to 20.0 mole percent (mol %); and making in the GPP reactor a first bimodal polyethylene polymer having a melt rheology property characterized by a first steady-state value; wherein the changing comprises increasing or decreasing a fresh quantity of the $(C_5-C_{20})$alkane(s) being fed into the GPP reactor so as to effectively increase or decrease a total concentration of the vented $(C_5-C_{20})$alkane(s) in the discharged gas/vapor mixture by at least 1.0 mol %; and after the changing step making a second bimodal polyethylene polymer having a melt rheology property characterized by a second steady-state value, which is less than or greater than-the first steady-state value by at least ±1.0%.

2. The method of claim 1 wherein the melt rheology property being changed is a melt flow ratio or a modulus ratio or both.

3. The method of claim 2 wherein the melt flow ratio is MFR5, wherein MFR5 equals $I_{21}/I_5$; measured according to Melt Flow Ratio MFR5 Test Method; and the modulus ratio is melt elasticity G'/G" (0.1 radians per second), wherein G' is elastic (storage) modulus and G" is viscous (loss) modulus, measured according to the Melt Elasticity Test Method.

4. The method of claim 1 wherein the metallocene catalyst of the bimodal catalyst system is an (alkyl-substituted cyclopentadienyl) (unsubstituted or alkyl-substituted cyclopentadienyl) $MX_2$ and the single-site non-metallocene catalyst of the bimodal catalyst system is a ((substituted-phenylamido) ethyl)-amine $MX_2$, wherein each M independently is zirconium (Zr) or hafnium (Hf); and each X is independently selected from F, Cl, Br, I, benzyl, —$CH_2Si(CH_3)_3$, a $(C_1-C_5)$alkyl, and a $(C_2-C_5)$alkenyl.

5. The method of claim 1 wherein the melt rheology property value is also independently changeable by changing a $H_2/C_2$ molar ratio and/or bed temperature in the GPP reactor, and wherein the $H_2/C_2$ molar ratio and bed temperature are kept constant during the method.

6. The method of claim 1 wherein the melt rheology property value is also independently changeable by changing a $H_2/C_2$ molar ratio or bed temperature or both in the GPP reactor, and wherein the method further comprises changing the $H_2/C_2$ molar ratio and/or bed temperature in such a way so as to add to the change in the melt rheology property value made by the change in $(C_5-C_{20})$alkane(s) concentration.

7. The method of claim 1 wherein the melt rheology property value is also independently changeable by changing a $H_2/C_2$ molar ratio or bed temperature or both in the GPP reactor, and wherein the method further comprises changing the $H_2/C_2$ molar ratio and/or bed temperature in such a way so as to partially subtract from the change in the melt rheology property value made by the change in $(C_5-C_{20})$alkane(s) concentration.

8. A method of independently changing a melt rheology property value of a bimodal polyethylene polymer being made using a bimodal catalyst system in a single gas phase polymerization (GPP) reactor under process conditions comprising $(C_5-C_{20})$alkane(s) in the GPP reactor, wherein the bimodal polyethylene polymer comprises a higher molecular weight (HMW) component and a lower molecular weight (LMW) component, wherein the bimodal catalyst system consists essentially of a metallocene catalyst and a single-site non-metallocene catalyst and the bimodal catalyst system is characterized by an inverse response to $(C_5-C_{20})$alkane(s) concentration such that when the $(C_5-C_{20})$alkane(s) concentration is increased, the melt rheology property value of a resulting bimodal polyethylene polymer is decreased, and when the $(C_5-C_{20})$alkane(s) concentration is decreased, the melt rheology property value of a resulting bimodal polyethylene polymer is increased; the method comprising:

changing concentration of the $(C_5-C_{20})$alkane(s) in the GPP reactor by an amount sufficient to effect a measurable change in the melt rheology property value; wherein any other process condition that could change the melt rheology property value is controlled in such a way so as to not negate an effect of the change in $(C_5-C_{20})$alkane(s) concentration on the melt rheology property value, wherein the single gas phase polymerization reactor is a fluidized-bed gas phase polymerization (FB-GPP) reactor and wherein the process conditions comprise (a) to (e): (a) the FB-GPP reactor has a fluidized resin bed at a bed temperature from 80 to 110 degrees Celsius (° C.); (b) the FB-GPP reactor receives feeds of respective controlled amounts of fresh ethylene, fresh bimodal catalyst system, fresh $(C_5-C_{20})$ alkane(s), optionally fresh hydrogen gas $(H_2)$ characterized by a hydrogen-to-ethylene $(H_2/C_2)$ molar ratio, and optionally fresh alpha-olefin characterized by an alpha-olefin-to-ethylene $(C_x/C_2)$ molar ratio; (c) polymerizing in the FB-GPP reactor some of the ethylene and, optionally, the alpha-olefin with the bimodal catalyst system; (d) discharging from the FB-GPP reactor a gas/vapor mixture comprising vented $(C_5-C_{20})$alkane(s), vented unreacted ethylene, vented unreacted hydrogen gas, if any, and vented unreacted alpha-olefin, if any, wherein the discharged gas/vapor mixture is characterized by a total concentration of the vented $(C_5-C_{20})$alkane(s) therein of from 1.0 to 20.0 mole percent (mol %); and (e) making in the FB-GPP reactor a first bimodal polyethylene polymer having a melt rheology property characterized by a first steady-state value; wherein the changing comprises increasing or decreasing the controlled amount of the fresh $(C_5-C_{20})$ alkane(s) being fed into the FB-GPP reactor so as to effectively increase or decrease a total concentration of the vented $(C_5-C_{20})$alkane(s) in the discharged gas/ vapor mixture by at least 1.0 mol %; and after the changing step making a second bimodal polyethylene polymer having a melt rheology property characterized by a second steady-state value, which is less than or greater than, respectively, the first steady-state value by at least ±1.0%.

* * * * *